Oct. 12, 1965

S. GYURIK ETAL 3,211,182

SERVO VALVE WITH ROTARY FIRST STAGE

Filed Dec. 2, 1963

INVENTORS
Stephan GYURIK
Christopher J. SLATER
Léo VADEBONCOEUR

BY

ATTORNEYS

Oct. 12, 1965    S. GYURIK ETAL    3,211,182
SERVO VALVE WITH ROTARY FIRST STAGE
Filed Dec. 2, 1963    2 Sheets-Sheet 2

INVENTORS
Stephan GYURIK
Christopher J. SLATER
Léo VADEBONCOEUR
BY
ATTORNEYS

3,211,182
SERVO VALVE WITH ROTARY FIRST STAGE

Stephan Gyurik, Christopher J. Slater, and Leo Vadeboncoeur, all of Montreal, Quebec, Canada, assignors to Jarry Hydraulics Limited, Montreal, Quebec, Canada
Filed Dec. 2, 1963, Ser. No. 327,318
5 Claims. (Cl. 137—625.61)

The present invention relates to a hydraulic servo valve.

The servo valve of the invention is intended for various control applications and is of particular usefulness in flow control.

The servo valve mechanism of the invention is characterized in that it is energized by the application to the primary thereof, of a rotary mechanical displacement which induces a state of pressure unbalance between two similarly restricted branches of a hydraulic system. The resulting unbalanced pressures being applied at opposite ends of a linearly displaceable secondary. The invention is further characterized in that it provides for a direct mechanical feedback between the secondary and the primary; the effect of the mechanical feedback being a recovery of the state of pressure equilibrium between the two similarly restricted hydraulic branches, by means of a translation of the secondary linear displacement into an angular or rotary displacement of a sleeve element around the primary.

The invention is particularly advantageous in that it permits an almost perfect linear response to the input signal. A second and perhaps more practical advantage of the invention results from the fact that on standby, the servo valve does not use or waste any hydraulic energy. The practicality of this advantage may be better understood if one considers that, most devices of the kind, such as those wherein the hydraulic pressure unbalance needed to actuate the secondary is produced by a so called "nozzle flapper" device, there prevails a constant loss of hydraulic power with no corresponding useful work. Such devices are therefore wasteful of hydraulic energy and should be avoided where the sources of energy are of very limited capacity.

The servo valve mechanism or hydraulic amplifier system to which the invention relates is useful for maintaining constant or controlling the flow of a fluid in a piping system, by application of a corrective actuation to a main control valve if and when a deviation from an optimum or preset flow value takes place and in order to restore such value. In such a case, the flow characteristics are constantly being measured by appropriate instruments and any deviation or departure from the desired flow value is transduced into a proportional electrical signal which on application to a torque motor coupled to the servo valve of the invention will induce the appropriate corrective hydraulic signal. The electrical impulse through the torque motor produces a corresponding angular displacement of its shaft. Because the torque motor shaft is coupled to the servo valve of the invention, any angular displacement of its shaft is communicated to the primary spool of the servo valve. Characteristically the spool of the servo valve primary is rotatable axially within a sleeve that is also capable of axial rotation within the valve housing or casing.

The major advantage of the new servo valve in comparison with known mechanisms of this type lies in its complete lack of consumption of hydraulic energy when amplification is not needed. This feature renders the valve adaptable to conditions of limited power supply such as prevail in guided missiles and other space crafts, for instance.

The various advantages previously outlined may be obtained with a servo valve mechanism made according to the invention and comprising: a body provided with first and second stage chambers axially at right angle to each other and interconnected by a passage; control pressure fluid lines connecting each end of said second stage to said first stage chamber and at two distinct locations; fluid pressure supply means to which each fluid line is connected; equal throttling restrictions in said fluid supply means, one restriction corresponding to each control pressure fluid line; a sleeve mounted triangular deviation in said first stage chamber; a shaft coaxial with and mounted for angular deviation in and independently of said sleeve; a spool axially slidable in said second stage chamber; a position feedback member depending from said sleeve and connected to said spool through said passage whereby axial displacement of said spool causes corresponding rotation of said sleeve; aperture means through said sleeve in communication with said control pressure fluid lines and said passage and groove means through said shaft adapted, when moved in one direction, from neutral position, to immediately place one control pressure fluid line only in communication with said passage and when moved in the opposite direction, from neutral position, to place the other control pressure fluid line only immediately in communication with said passage; said shaft blocking both said fluid lines when in neutral position with respect to said sleeve.

A better understanding of the invention will be afforded by the following description which has reference to the annexed drawings wherein:

FIG. 2 is a longitudinal cross-section of a servo valve made according to the invention, while

Figure 1:
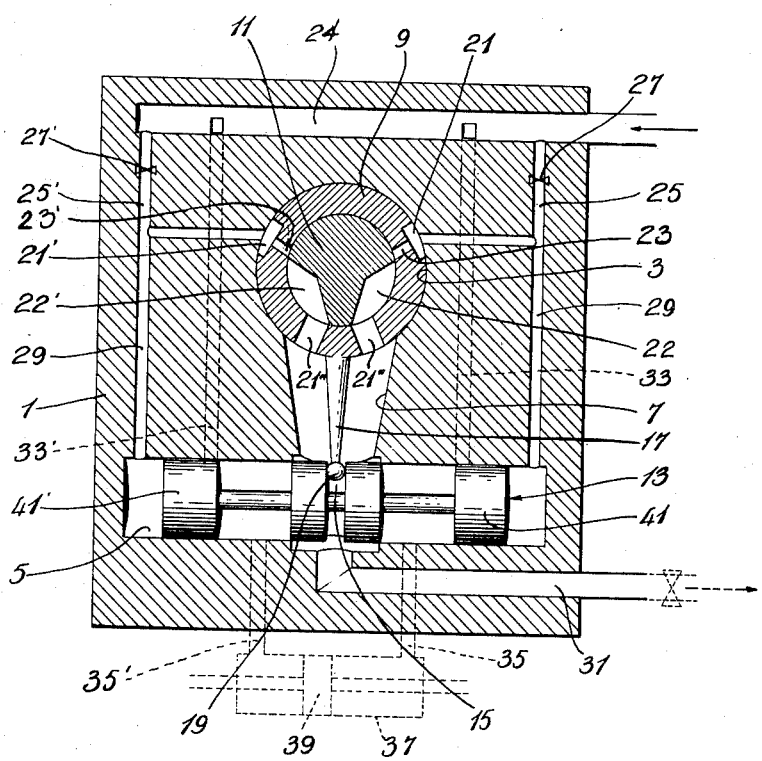
FIG. 1 is a diagrammatic cross-section view of a servo valve according to the invention and intended to more particularly illustrate the principle thereof.

FIG. 1, intended to illustrate the principle of the invention, shows a body 1 provided with a first stage chamber 3 and a second stage chamber 5 distant therefrom and having a longitudinal axis substantially perpendicular to that of the first stage chamber 3. A passage 7 interconnects the first and second chambers 3 and 5.

The valving means of the first stage chamber is generally composed of a sleeve 9 mounted therein for limited rotation or angular deviation from a neutral position. Within the bore of sleeve 9 is received a shaft 11 connected, at one end, to a torque motor which will be referred to again later.

The valving means of the second stage chamber 5 is a spool-like member 13 provided, centrally thereof with engaging means 15 and at each end with piston lands 41, 41'.

Depending from sleeve 9 and rigid therewith is a feedback member 17 terminating, at the free end thereof, with a ball 19 adapted to be received between the two piston-like elements of engaging means 15.

Through sleeve 9 are provided apertures 21, 21' and 21", the latter normally opening into passage 7 leading to the second stage chamber 5. Pressure fluid is supplied from a supply chamber means consisting of a supply chamber 24 and supply ducts 25 and 25'. Each of these supply ducts are equal in cross-section and are provided with equal throttling restrictions 27, 27'. Supply ducts 25, 25' are joined to control pressure fluid lines 29, 29', respectively. Each of lines 29, 29' connects one end of the second stage chamber 5 to one of the sleeve apertures 21, 21'.

Shaft 11 is provided with grooves 22, 22', opening, on the one hand, into discharge passage 7 through sleeve apertures 21" and adapted to come in communication with either of metering ports 23, 23' of apertures 21, 21' whenever angularly deviated, as will be explained hereinafter.

Passage 7 opens at one end into the second stage chamber as said previously, and the latter also opens into an outlet or return channel 31.

Two operating fluid inlet lines 33, 33' connect the supply chamber 24 to the second stage chamber 5 while two operating fluid outlet lines 35, 35' join the said second stage chamber 5 to cylinder 37 within which a piston 39 is slidably received.

Two channels or grooves 22, 22', provided through shaft 11, serve to respectively interconnect sleeve apertures 21, 21' with passage 7, alternatively. In neutral median position, which is that illustrated in FIG. 1, apertures 21, 21' are however blocked by shaft 11.

Similarly, fluid inlet lines 33, 33' are blocked by lands 41, 41' respectively of spool 13.

It should be noted that the positioning of grooves 22, 22' of shaft 11 in relation to apertures 21, 21' is such that as soon as shaft 11 starts deviating from a neutral position, one of the two apertures 21 or 21' will be placed in communication with either of grooves 22 or 22' depending on the direction of the deviation. Consequently, the freed aperture will place the corresponding fluid line in communication with discharge passage 7 and subsequently to discharge outlet or channel 31.

In a similar manner, as soon as spool 13 moves axially, one of the two fluid supply inlet lines 33, 33' places supply chamber 24 in communication with the second stage chamber 5.

In order to make the angular displacement of shaft 11 of the rotary valve proportional to the electrical signal or variation thereof that results from a variation in the main flow, it is necessary for the rotary valve member to operate against a constraint. This constraint is generally applied to the shaft of the torque motor itself rather than to the shaft 11 of the first stage; it may result from a positioning device whereby a radial extension 61 of the motor shaft is located between the ends of a pair of opposed calibrated helical springs which in median position apply equal but opposing forces thereon; the springs being housed in tubes 62 on FIG. 2. The proportionality between the input electrical signal and the angular shaft displacement is an inherent property of torque motors generally. The torque motor preferred for use in combination with the present invention is one in which the torque arising from any given electrical input signal is nullified by an opposing equal torque the magnitude of which is a rectilinear function of the angular displacement, in such a manner that within its design limits the incremental ratio of input signal to corresponding angular shaft displacement is a constant.

The diagrammatic servo valve just described operates as follows:

It will be assumed that fluid pressure is applied to the supply chamber 24 from a pumping station and that the same pressure exists in both fluid lines 25, 25' and at the ends of the second stage chamber 5 whereby spool 13 is retained in the neutral median position shown in FIG. 1.

Let us assume now that shaft 11 is shifted angularly counter-clockwise due to a flow variation in the fluid system under control, which variation being sensed and translated into a corresponding electrical signal or variation thereof, the latter is applied to the torque motor to which shaft 11 is coupled. As soon as rotation starts, communication between control fluid line 29 and discharge passage 7 takes place and the control pressure in line 29 drops due to restriction 27. Consequently, the pressure in the corresponding end of chamber 5 also drops whereby spool 13 is moved to the right of FIG. 1 due to the greater pressure at the other end of chamber 5.

Shifting of spool 13 to the right also causes sleeve 9 to deviate counter-clockwise through the action of the feedback member 17. The feedback used is a position feedback rather than a force feedback. It has the effect of making the spool position, and therefore the fluid flow opening proportional to the signal force.

At the same time, operating fluid inlet line 33 opens into second stage chamber 5 and then pressure is applied on the right hand side of cylinder 37 forcing piston 39 to the left. A corrective impulse is therefore applied to the apparatus being controlled and the desired pressure in the fluid is resumed, thus forcing shaft 11 back to the neutral position shown in FIG. 1. The cycle of operation just described then takes place in reverse.

It should be understood that means other than piston 39 and operating fluid lines 33, 33', 35, 35' may be resorted to in order to obtain correction of the apparatus under control.

Figure 2:
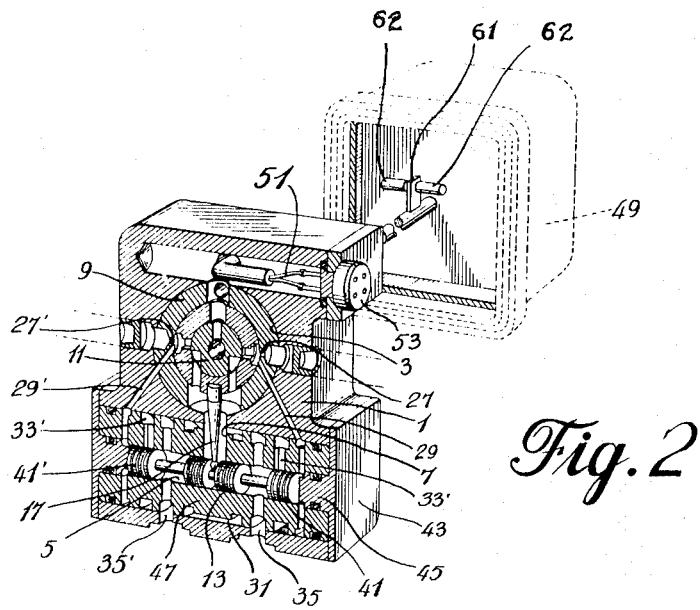
Figure 3:
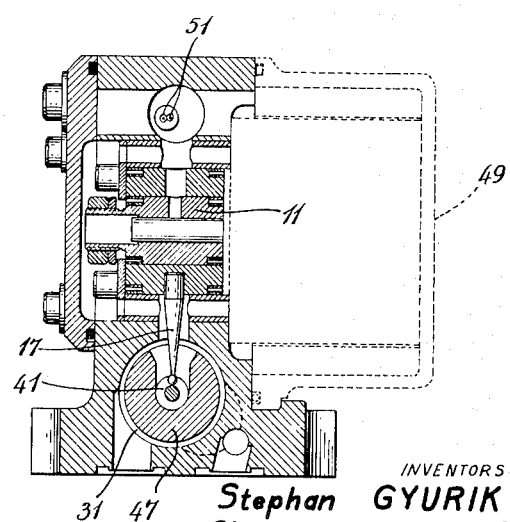
FIG. 3 is a transverse cross-section of the same servo valve.

A specific embodiment of the servo valve made according to the invention is illustrated in FIGS. 2 and 3.

In the example illustrated, it can be seen that second stage chamber 5 is formed by drilling body 1 to form a through bore which is eventually closed at each end by a cap member 43 having a central cylindrical lug 45. Over each lug 45 is mounted a cylindrical body 47, the bore of which forms the second stage chamber 5. The said cylindrical body 47 is also provided with the necessary circumferential channels or grooves and radical passages to connect, with the second stage chamber 5, the fluid lines 29, 29', the operating fluid inlet lines 33, 33' and outlet lines 35, 35' and finally the outlet or return channel 31 which allow the pressure fluid to escape from passage 7 and chamber 5 and return to the pump station.

The servo valve may be adapted for direct mounting on a torque motor 49 to form a complete unit therewith, with the torque motor leads 51 extending through the upper portion of the servo valve body and terminating at a plug-in member 53 opening exteriorly of the body 1.

Although a specific embodiment of the invention has just been described, it will be understood that various modifications may be made thereto without departing from the spirit of the invention, the scope of which should only be construed from the appended claims.

We claim:
1. A servo valve comprising:
   (a) a body provided with a first and a second stage chamber disposed in right angular axial relationship one above the other end interconnected by a passage;
   (b) fluid lines connecting each end of said second stage chamber to said first stage chamber at two distinct locations;
   (c) fluid pressure supply chamber means to which each fluid line is connected;
   (d) equal throttling restrictions in said supply chamber means, one restriction corresponding to each fluid line;
   (e) a sleeve mounted for angular deviation in said first stage chamber;
   (f) a shaft coaxial with and mounted for angular deviation in and independently of said sleeve;
   (g) a spool axially slidable in said second stage chamber;
   (h) a feedback member depending from said sleeve at one end and positively connected to said spool at the other end, through said passage whereby any axial displacement of said spool is directly accompanied by a corresponding rotation of said sleeve;
   (i) aperture means through said sleeve in communication with said fluid lines and said passage and grooves means through said shaft adapted, when moved in one direction, from neutral position, to place one fluid line only in communication with said passage and when moved in the opposite direction, from neutral position, to place the other fluid line only in communication with said passage; said shaft, in neutral position, blocking both said fluid lines.
2. A servo valve comprising:
   (a) a body provided with a first and a second stage chamber interconnected by a common fluid return passage passage;

(b) a sleeve mounted for angular deviation in said first stage chamber;

(c) a shaft coaxial with and mounted for angular deviation in said sleeve independently thereof;

(d) a spool axially slidable in said second stage chamber;

(e) a feedback member depending from said sleeve and connected to said spool through said passage whereby any axial displacement of the spool is instantaneously and absolutely communicated to the said sleeve to cause a positively corresponding rotation of said sleeve;

(f) fluid lines connecting each end of said second stage chamber to distinct locations in said first stage chamber;

(g) said sleeve having through apertures in communication with each fluid line and with said passage;

(h) said shaft having grooves in communication with said passage through said passage apertures of said sleeve and terminating immediately short, in neutral position, of each fluid line apertures of said sleeve on a common side whereby rotation of said shaft in one direction or the other will immediately place one fluid line in communication with said passage while still blocking the other fluid line from said passage;

(i) fluid pressure supply chamber means to which each fluid line is connected, and (j) equal throttling restrictions in said supply means, each corresponding to one fluid line, whereby angular deviation of said shaft from neutral position will open one sleeve aperture to said passage and cause a pressure drop in the corresponding fluid line thereby causing shifting of the second stage spool and deviation of said sleeve through said feedback member to thus again close said sleeve aperture.

3. A servo valve comprising:

(a) a body provided with a first cylindrical stage chamber and a second cylindrical stage chamber; said chambers being interconnected and having their axes substantially normal, to one another, (b) a cylindrical sleeve mounted for angular displacement in said first stage chamber;

(c) a shaft coaxially mounted for angular displacement in and independently of said sleeve and connected for actuation to a torque motor output shaft;

(d) a cylindrical spool axially slidable in said second stage chamber; said spool having two end lands and a central engaging means;

(e) a feedback member depending from said sleeve and connected to said central engaging means whereby axial displacement of the spool causes corresponding angular displacement of said sleeve;

(f) fluid lines of substantially equal cross-sections connecting each end of said second stage chamber to distinct locations in said first stage chamber;

(g) said sleeve having through apertures in communication with each fluid line and with said passage;

(h) said shaft having grooves in communication with said passage through said passage apertures of said sleeve and terminating immediately short, in neutral position, of each fluid line apertures of said sleeve on a common side whereby rotation of said shaft in one direction or the other will immediately place one fluid line in communication with said passage while still blocking the other fluid line from said passage;

(i) fluid pressure supply chamber means to which each fluid line is connected;

(j) equal throttling restrictions in said supply means, each corresponding to one fluid line;

(k) operating fluid inlet lines opening into said second stage chamber at such locations as to be closed by the spool lands in neutral position of said spool while one only opens immediately upon axial displacement of the spool in either direction, and (l) operating fluid outlet lines opening into said second stage chamber between said end lands.

4. A servo valve as claimed in claim 3, wherein said operating fluid inlet lines are connected to said fluid supply chamber means.

5. A two stage electro-hydraulic flow-control valve operable by pressure from a source in response to an angular displacement signal from an electrical torque servo motor, comprising:

(a) a first stage presenting a cylindrical chamber, a pair of oppositely facing input openings in the cylindrical wall of said chamber; a cylindrical ring rotatable inside said chamber and having bores in pressure communication with each of said openings and with a peripheral discharge hole opening into a discharge passage located between the input openings in the wall of said chamber; a radial feedback arm on said cylindrical ring and extending into and through said discharge passage; a massive cylindrical core rotatable inside said cylindrical ring and coupled to and for rotary displacement with said electrical torque servo motor, said massive cylindrical core presenting a pair of holes each of which has an edge in metering relation with a corresponding edge of one of the bores of the cylindrical ring and communicates with the peripheral discharge hole of said ring;

(b) a second stage cylindrical chamber, each end of which is in pressure communication with one of the input openings of the said first stage and, through a restriction, with the pressure source; a rectilinearly slidable spool inside said second stage chamber; intake pressure and discharge pressure connections to said second stage and alternative output and return pressure connections controlled by said spool; said second stage chamber being right angularly disposed with respect to said first stage chamber, the chambers being connected through the said discharge passage; said radial feedback arm projecting inside said second stage chamber and terminating in the form of a ball exactly located and received between two oppositely facing side walls of an annular groove in said spool, so that any linear displacement of the spool is translated into a corresponding angular displacement of the first stage cylindrical ring.

References Cited by the Examiner

UNITED STATES PATENTS

| | | | |
|---|---|---|---|
| 1,361,666 | 12/20 | Barringer | 137—625.42 |
| 2,969,808 | 1/61 | Horlacher | 137—625.63 |
| 2,992,633 | 7/61 | Stiglic et al. | 91—51 X |

M. CARY NELSON, *Primary Examiner.*

MARTIN P. SCHWADRON, *Examiner.*